(12) United States Patent
Katz

(10) Patent No.: US 9,164,580 B2
(45) Date of Patent: Oct. 20, 2015

(54) CALIBRATION OF EYE TRACKING SYSTEM

(75) Inventor: Sagi Katz, Yokneam Ilit (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 482 days.

(21) Appl. No.: 13/594,500

(22) Filed: Aug. 24, 2012

(65) Prior Publication Data

US 2014/0055591 A1 Feb. 27, 2014

(51) Int. Cl.
*G06F 3/01* (2006.01)
*G06F 21/31* (2013.01)
*G06F 21/32* (2013.01)

(52) U.S. Cl.
CPC .............. *G06F 3/013* (2013.01); *G06F 21/316* (2013.01); *G06F 21/32* (2013.01)

(58) Field of Classification Search
CPC ....... G06F 3/013; G06F 21/32; G06F 21/316; G06F 21/36
USPC ......................................... 345/7–9, 156–167
See application file for complete search history.

(56) References Cited

U.S. PATENT DOCUMENTS

| | | | |
|---|---|---|---|
| 6,282,553 B1 | 8/2001 | Flickner et al. | |
| 7,522,344 B1 | 4/2009 | Curatu et al. | |
| 7,986,816 B1 | 7/2011 | Hoanca et al. | |
| 2003/0076300 A1 | 4/2003 | Lauper et al. | |
| 2008/0137916 A1 | 6/2008 | Lauper et al. | |
| 2009/0141895 A1 | 6/2009 | Anderson et al. | |
| 2012/0057129 A1 | 3/2012 | Durnell et al. | |

OTHER PUBLICATIONS

ISA European Patent Office, International Search Report & Written Opinion for PCT/GB2013/052236, Nov. 13, 2013, 12 pages.
Luca, et al., "Look Into My Eyes! Can You Guess My Password?", Retrieved at <<http://www.medien.ifi.lmu.de/pubdb/publications/pub/deluca2009soups/deluca2009soups.pdf>>, Proceedings: Symposium on Usable Privacy and Security (SOUPS), Jul. 15, 2009, pp. 12.
Bednarik, et al., "Eye-Movements as a Biometric", Retrieved at <<http://citeseerx.ist.psu.edu/viewdoc/download;jsessionid=7D6DF88A259ADAF2008D2AF3B39DC69D?doi=10.1.1.157.9188&rep=rep1&type=pdf>>, Proceedings of the 14th Scandinavian conference on Image Analysis, Jun. 19, 2005, pp. 780-789.
Kocejko, et al., "Authentication for Elders and Disabled using Eye Tracking", Retrieved at <<ieeexplore.ieee.org/stamp/stamp.jsp?arnumber=05514502>>, Proceedings: 2010 3rd Conference on Human System Interactions (HSI), May 14, 2010, pp. 629-633.

(Continued)

*Primary Examiner* — Michael Pervan
(74) *Attorney, Agent, or Firm* — Micah Goldsmith; Judy Yee; Micky Minhas

(57) ABSTRACT

Embodiments are disclosed that relate to calibrating an eye tracking system for a computing device. For example, one disclosed embodiment provides, in a computing device comprising a gaze estimation system, a method of calibrating the gaze estimation system. The method includes receiving a request to log a user onto the computing device, outputting a passcode entry display image to a display device, receiving image data from one or more eye tracking cameras, and from the image data, determining a gaze scanpath representing a path of a user's gaze on the passcode entry display image. The method further includes comparing the gaze scanpath to a stored scanpath for the user, and calibrating the gaze estimation system based upon a result of comparing the gaze scanpath to the stored scanpath for the user.

20 Claims, 5 Drawing Sheets

(56) References Cited

OTHER PUBLICATIONS

Graham-Rowe, Duncan., "For Your Eyes Only", Retrieved at <<http://www.technologyreview.com/computing/26700/>>, Retrieved Date: May 10, 2012, pp. 4.

Grifantini, Kristina., "Eye Tracking for Mobile Control", Retrieved at <<http://www.technologyreview.com/computing/25369/?mod=related>>, Retrieved Date: May 10, 2012, pp. 3.

ID-U Biometrics, <idu-biometrics.com>, Access date: Jul. 30, 2012, 1 page.

Villanueva, Arantxa et al., "A Novel Gaze Estimation System With One Calibration Point," IEEE Transactinos on Systems, Man, and Cybernetics, vol. 38, No. 4, Aug. 2008, 16 pages.

Guestrin, Elias D. et al., "Remote Point-Of-Gaze Estimation with Single-Point Personal Calibration Based on the Pupil Boundary and Corneal Reflections," Proc. CCECE, 2011, 6 pages.

Sinofsky, Steven, "Signing in with a picture password," <http://blogs.msdn.com/b/b8/archive/2011/12/16/signing-in-with-a-picture-password.aspx>, Published Dec. 16, 2011, 23 pages.

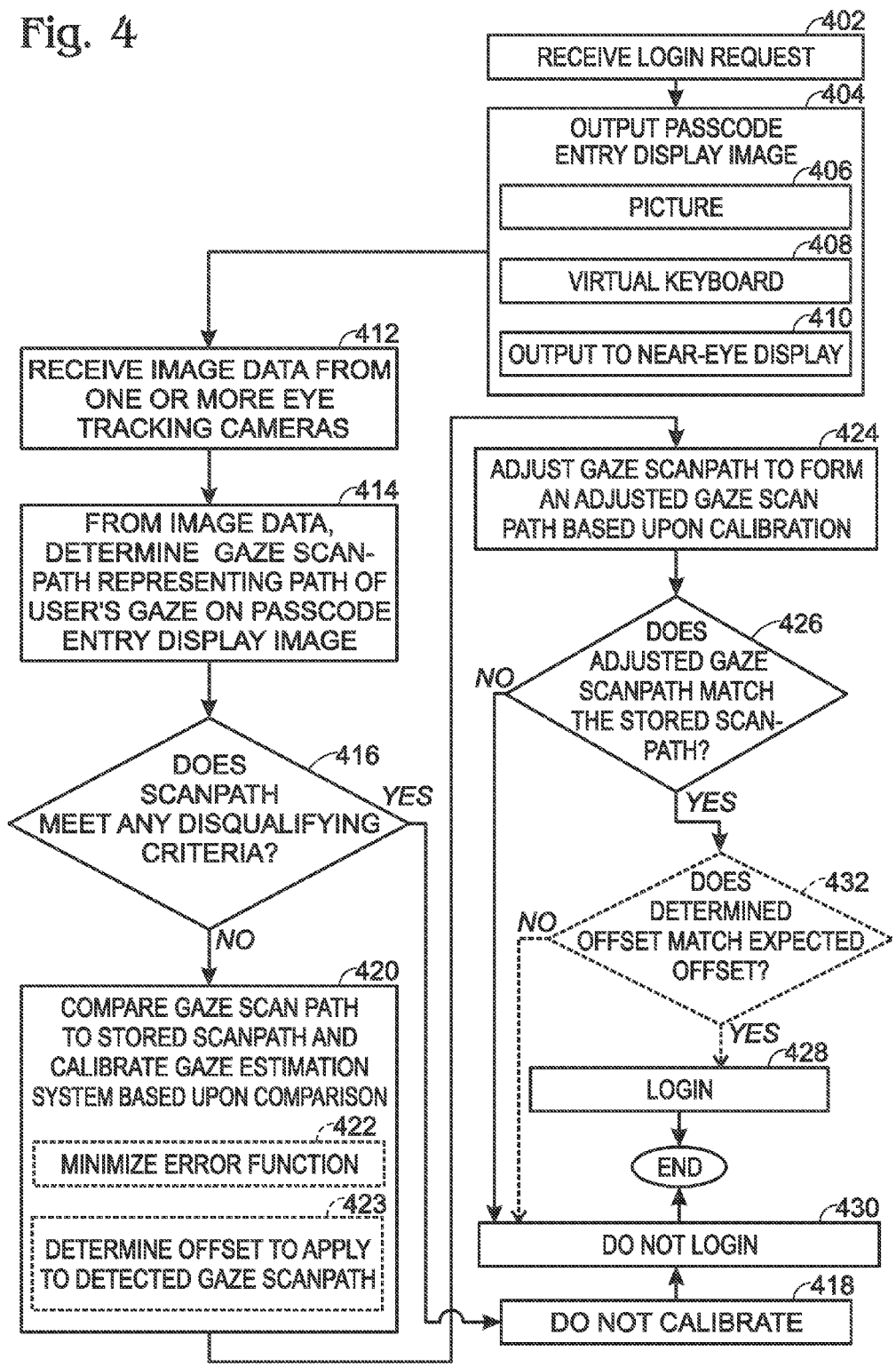

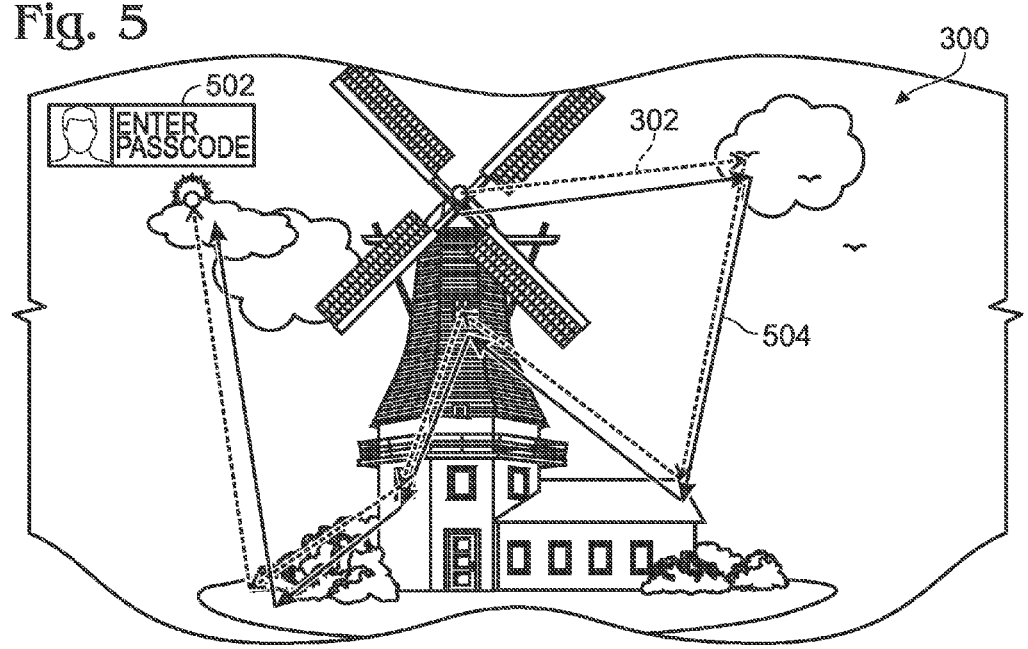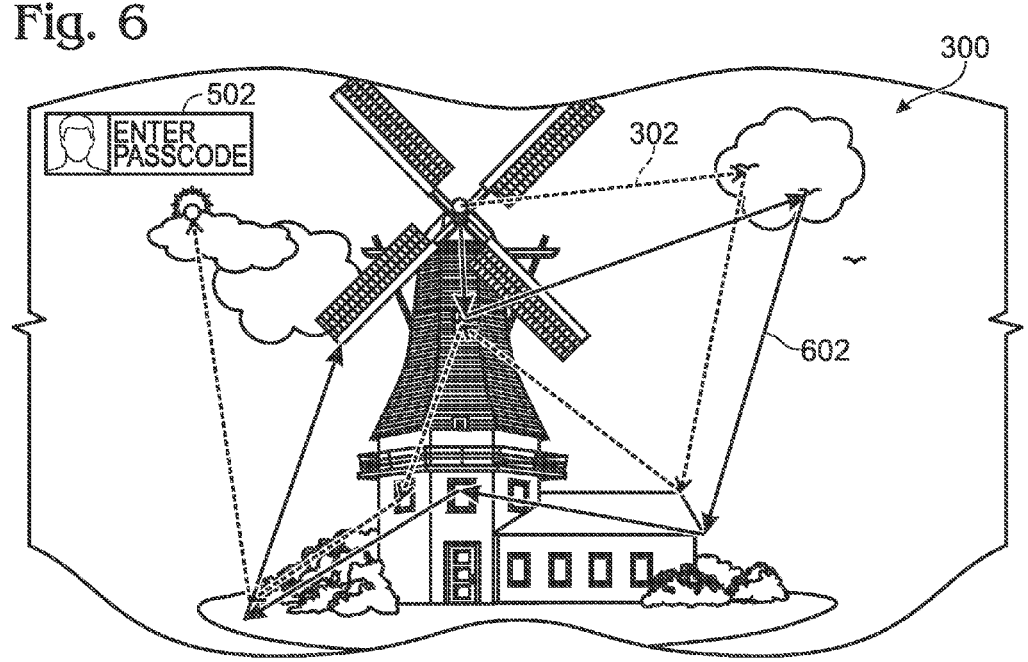

CALIBRATION OF EYE TRACKING SYSTEM

BACKGROUND

Eye tracking may be used in computing systems to detect user inputs made by gazing at virtual and/or real objects. For example, a computing device may be configured to detect user interactions with a displayed user interface by detecting a location on the user interface at which the user gazes, and registering an input at that location.

However, the use of eye tracking as a computing system input mechanism may pose various challenges. For example, some eye tracking systems may utilize images of a center of a user's pupil and also of corneal reflections from glint light sources to determine a line of sight of the user's eye. However, different users may have anatomical differences that can affect such a determination. For example, the location of the fovea on the retina may differ from person to person. As such, the visual axis of the eye (i.e. the axis extending from the physical object imaged on the user's fovea to the fovea) may be offset from the optical axis of the eye (i.e. the axis extending through the center of the pupil to the back pole of the eyeball). As the image data is used to determine an estimate of the optical axis of the eye, such an offset may complicate the accurate estimate of an actual location at which the user is gazing.

SUMMARY

Various embodiments are disclosed herein that relate to calibrating an eye tracking system for a computing device. For example, one disclosed embodiment provides, in a computing device comprising a gaze estimation system, a method of calibrating the gaze estimation system. The method includes receiving a request to log a user onto the computing device, outputting a passcode entry display image to a display device, receiving image data from one or more eye tracking cameras, and from the image data, determining a gaze scanpath representing a path of a user's gaze on the passcode entry display image. The method further includes comparing the gaze scanpath to a stored scanpath for the user, and calibrating the gaze estimation system based upon a result of comparing the gaze scanpath to the stored scanpath for the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows a flow diagram depicting an example embodiment of a method for calibrating an eye tracking system.

FIG. 5 shows an example detected gaze scanpath compared to an example stored scanpath for the passcode entry display image of FIG. 2.

FIG. 6 shows a detected scanpath that meets an example disqualifying criterion.

DETAILED DESCRIPTION

Figure 1:
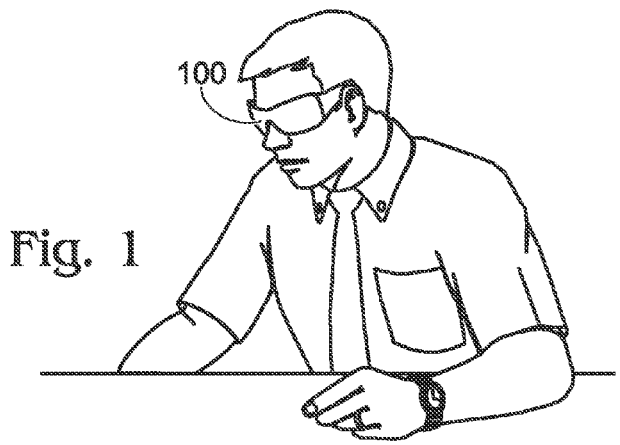
FIG. 1 shows an example embodiment of a computing system in the form of a head-mounted display comprising an eye tracking system.

As mentioned above, eye tracking may be used in various computing systems as a user input mechanism. Various types of computing systems may utilize an eye tracking system for receiving user inputs. One example embodiment of such a computing system is illustrated in FIG. 1 as a wearable computing system in the form of a head-mounted display 100 in which images are displayed to the user via a see-through display system. As described in more detail below, head-mounted display system 100 includes an eye tracking system in the form of one or more user-facing image sensors configured to capture images of a user's eye, and also may include one or more glint light sources configured to reflect light from the cornea of the user's eye. Analysis of image data capturing the pupil and glints from the glint light sources allow an estimation of a direction of a user's gaze to be determined.

Figure 2:
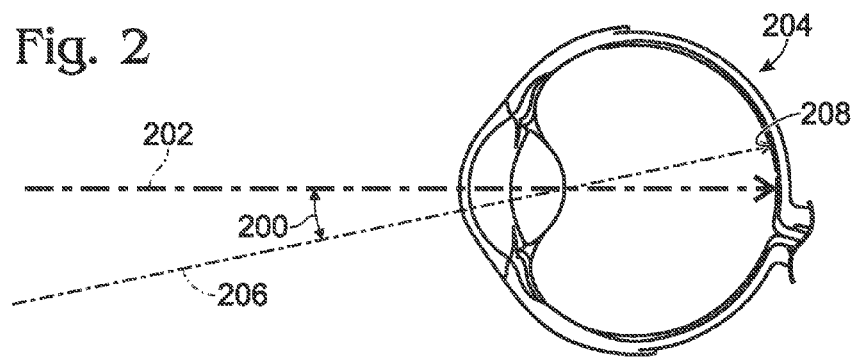
FIG. 2 shows a schematic diagram illustrating an offset between an optical axis and a visual axis of a human eye.

However, as mentioned above, anatomical differences between users, including but not limited to the location of the fovea on the retina, may pose difficulties in accurately estimating an actual location of the user's gaze. FIG. 2 illustrates an example offset 200 between an optical axis 202 of an eye 204 and a visual axis 206 of eye 204. As mentioned above, optical axis 202 extends through the center of the pupil to the back pole of the eyeball, while visual axis 206 extends from an object being viewed to the image of the object on fovea 208 of eye 204. Such an offset may be on the order of five degrees or greater.

An estimate of optical axis 202 may be detected from image data capturing images of the pupil and corneal glint reflections. To help estimate gaze location more accurately, an eye tracking system calibration process may be performed to help determine offset 200, thereby allowing a correction to be applied to the determined optical axis to help to reduce potential errors in gaze location determination.

Depending upon the camera and display configuration (for example, wearable or not wearable), a calibration process may involve having a user look at different targets on a screen or in the real world, and determining differences between the location of the target and the location of the user's detected optical axis (or other initial measure of gaze location) projected onto the target. However, performing such a calibration process at a start of each eye tracking use session may be annoying to users over time. Thus, embodiments are disclosed herein that relate to calibrating an eye tracking system in a less obtrusive manner by combining an eye tracking system calibration process and a passcode entry process.

For security purposes, computing systems may require a user to enter a passcode to log in to a new use session. Some computing systems may utilize an alphanumeric password, while other computing systems may utilize a picture passcode. Briefly, a picture passcode comprises a user input of a specific order of and type of user interactions with a displayed picture. In a touch screen computing device, a user may enter a picture passcode by performing gestures such as touching, swiping, circling, etc. at various elements of the picture in a particular order. In a computing device utilizing an eye tracking system as disclosed herein, a picture passcode may be entered by gazing at several locations on a passcode entry display image in a particular order, and/or scanning between the locations in a particular path, such that the gaze scanpath comprises a series of fixation locations and/or saccades (i.e. movements between the fixations). The passcode entry display image may comprise any suitable image, including but not limited to a picture (e.g. scenery, people, graphic art, and/or any other suitable visual information), an image of a virtual keyboard, and/or any other suitable type of image.

Figure 3:
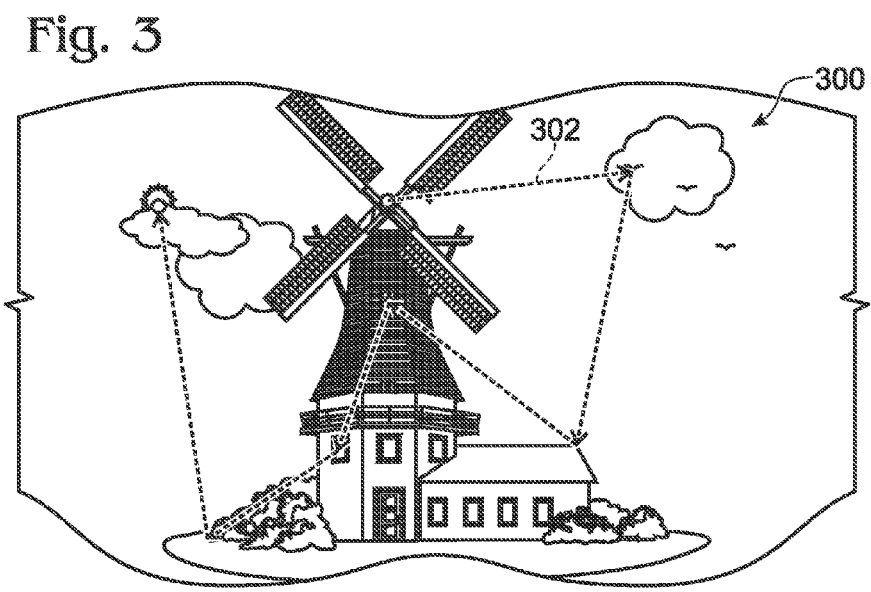
FIG. 3 shows an example embodiment of a passcode entry display image displayed via the head-mounted display of FIG. 1.

FIG. 3 shows an example picture passcode entry display image 300 in the form of a picture of scenery. When a user initially sets up an account, the eye tracking system may first be calibrated to the user's eye(s) via a calibration process, and then may record and store the user's picture passcode, illustrated as stored scanpath 302 that represents movement of the user's gaze between different features of the image. In stored scanpath 302, fixations are represented by the terminal points of the arrows, and saccades are represented by the paths of the arrows. Then, when that user logs in for a subsequent use session by again entering the picture passcode, as explained in more detail below, the eye tracking system may be calibrated to the user's eye for that use session based upon the user's gaze scanpath detected in the picture passcode login process compared to the stored scanpath.

Any suitable initial set-up process may be used. For example, in some embodiments, an initial set-up process may involve initially calibrating the eye tracking system for a user's visual axis offset by directing the user to look at a specific point (e.g. symbol, text, user interface button to actuate to move to next set-up phase, etc.), and detecting the user's eye position while the user looks at this specific point. This may allow the true offset of the user's visual axis to be determined. Then, after initially determining the user's visual axis offset, the user may be asked to specify a picture password for future login processes. In other embodiments, the eye tracking system may automatically generate a picture password (for example, by detecting a random series of features in the image), and prompt the user to look at and memorize the series of features. As the system knows the specific locations that the user will be looking at while memorizing the password, the visual axis offset may be determined via this process. It will be understood that these embodiments of an initial set-up process are presented for the purpose of example and are not intended to be limiting in any manner.

After the initial set-up process, calibration for future use sessions by that user may be performed via the user's passcode entry process. FIG. 4 shows a flow diagram depicting an embodiment of a method 400 for utilizing a passcode entry process to calibrate an eye tracking system. Method 400 comprises, at 402, receiving a login request. For example, in embodiments utilizing a head-mounted display, the login request may be received via detecting an image of eyes via the eye tracking system, a voice command, a motion input detected by a motion sensor (e.g. a user picking the display up and putting it on, a head gesture performed by the user, etc.), another body part gesture detected via an outward facing image sensor (e.g. hand gesture), a pre-calibration gaze input (e.g. performed via a user interface with reduced sensitivity to errors in gaze location determination), and/or any other suitable input.

Upon receiving the login request, method 400 comprises, at 404, outputting a passcode entry display image to a display device. Examples of suitable passcode display screens include, but are not limited to, a picture 406 for receipt of a picture password input, and a virtual keyboard 408 for receipt of an alphanumeric password. The passcode display screen may be output to any suitable display device, including but not limited to a near-eye display 410 of a head-mounted display system. Examples of other suitable displays include, but are not limited to, monitors, televisions, built-in displays (e.g. on a smart phone, portable media device, laptop, tablet computer), etc. FIG. 5 shows one non-limiting example passcode entry display image comprising image 300 of FIG. 3, and also an icon 502 representing the particular user that made the login request.

In response to outputting the passcode entry display image, method 400 comprises, at 412, receiving image data from one or more eye tracking cameras, and at 414, determining a gaze scanpath representing a path of a user's gaze on the passcode entry display image. An example gaze scanpath is shown at 504 in FIG. 5. The gaze scanpath may be determined from the image data in any suitable manner. For example, in some embodiments, the gaze scanpath may be determined by tracking eye motions via image data of the eye's pupil and corneal reflections of light from glint light sources.

After the gaze scanpath has been determined, the gaze scanpath may be used to calibrate the eye tracking system and also to decide whether to complete the logon process. However, as indicated at 416, in some embodiments, it may first be determined whether the gaze scanpath meets any disqualifying criteria that make the gaze scanpath unsuitable for calibrating the gaze scanpath. If any of such criteria are met, method 400 may comprise, at 418, not performing the calibration (and not logging in at 430).

Figure 7:
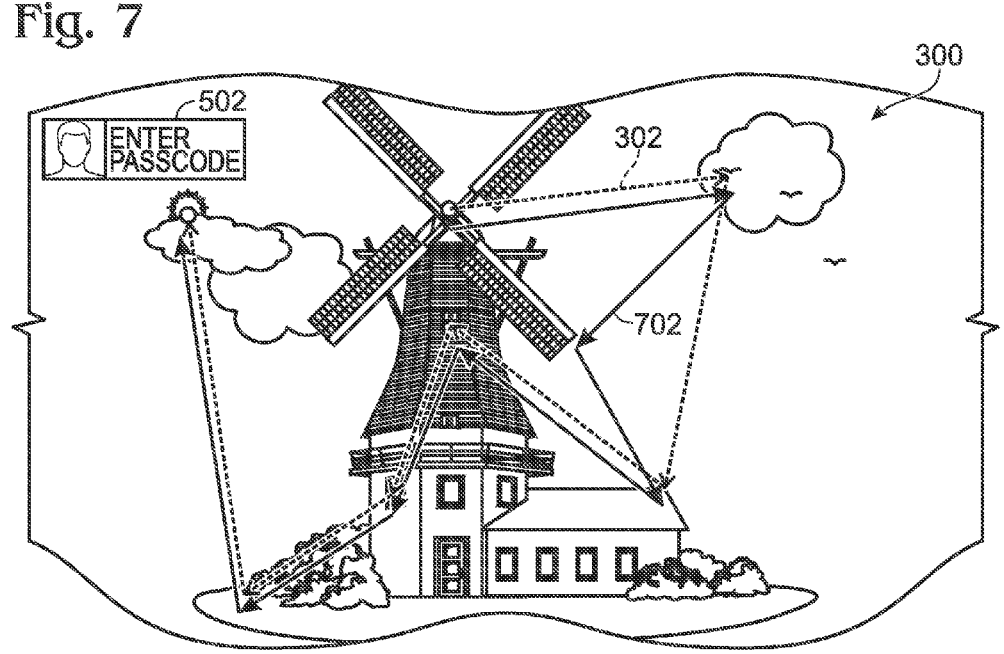
FIG. 7 shows another detected scanpath that meets an example disqualifying criterion.
Figure 8:
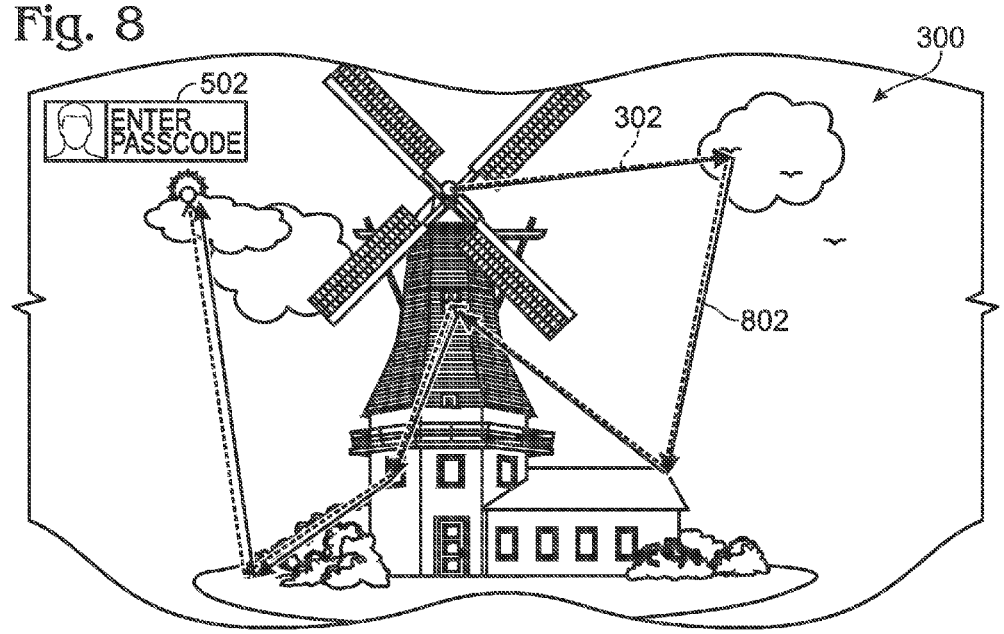
FIG. 8 shows an adjusted gaze scanpath after calibrating the eye tracking system and adjusting the detected gaze scanpath.

Gaze scanpath 504 of FIG. 5 generally follows the stored scanpath 302, and thus may not meet any disqualifying criteria. In contrast, FIGS. 6 and 7 illustrate gaze scanpaths that may meet one or more disqualifying criteria. First referring to FIG. 6, a detected gaze scanpath 602 is shown that comprises fixations on (or near) those of stored scanpath 302 in a different order than in the stored scanpath 302. As such, detected gaze scanpath 602 may be rejected as exceeding a maximum pre-calibration offset from stored scanpath 302 along at least part of its path. Next, FIG. 7 illustrates a detected gaze scanpath 702 that selects the elements of stored scanpath 302 in a correct order, but that also includes an additional element (e.g. where the detected scanpath moves near the blade of the windmill). In this instance, detected gaze scanpath 702 also may exceed a maximum offset from stored scanpath 302 at that location. It will be understood that the embodiments of FIGS. 6 and 7 are presented for the purpose of example and are not intended to be limiting, and that any suitable disqualifying criteria may be applied to a detected gaze scanpath. Further, such disqualifying criteria may or may not be based upon comparing the detected gaze scanpath to a stored scanpath, and instead or additionally may be based upon characteristics of the detected gaze scanpath itself (e.g. a criterion may specify that a gaze scanpath cannot cross itself).

If the detected gaze scanpath does not meet any disqualifying criteria, then method 400 comprises, at 420, comparing the detected gaze scanpath to the stored scanpath, and calibrating the gaze estimation system based upon the comparison. Any suitable calibration method may be used. For example, in some embodiments, calibrating the gaze estimation system may comprise, at 422, minimizing an error function that compares the detected gaze scanpath to the stored scanpath, and may also comprise, at 423, determining an offset to apply to the detected gaze scanpath based upon the minimization of the error function. It will be understood that these particular methods of calibrating the gaze estimation system are presented for the purpose of example, and are not intended to be limiting in any manner.

After calibrating the gaze estimation system, method 400 comprises, at 424, adjusting the detected gaze scanpath to form an adjusted gaze scanpath based upon the calibration. This may comprise, for example, applying an offset determined from the calibration process, and/or any other suitable adjustments. Then, method 400 comprises, at 426, determining whether the adjusted gaze scanpath matches the stored scanpath (e.g. within an allowed tolerance level). If the adjusted gaze scanpath matches the stored scanpath, then method 400 comprises, at 428, logging in. Likewise, if the adjusted gaze scanpath does not match the stored scanpath, then method 400 comprises, at 430, not logging in.

In some embodiments, additional determinations may be made before allowing the user to login. For example, as an additional or alternative determination, method 400 may comprise, at 432, determining whether a difference between an offset determined by comparing the detected and stored scanpaths matches an expected offset, and logging in only if the determined offset matches the expected offset. In this manner, a biometric quantity may be applied to the login process as an additional security measure. It will be understood that any other user-specific optical anatomical property may be detected other than a measurement related to a user's optical/visual axes offset. As another example, a radius of curvature of a cornea and a distance between the center of the curvature and the center of the pupil may be determined from image data of the pupil and reflected glint light. It will likewise be understood that the detected gaze scanpath may be used to select a current user from among a plurality of recognized users (e.g. by identifying a most similar stored scanpath to the detected gaze scanpath), and that the calibration may be performed after selecting the user.

Figure 9:
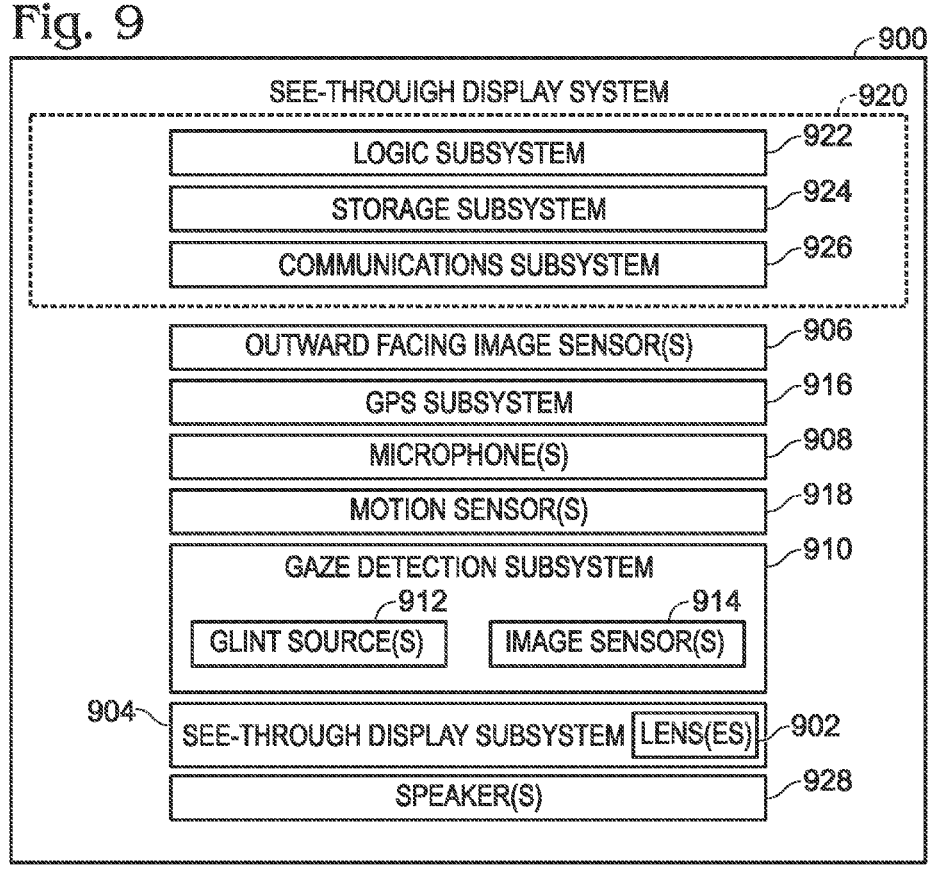
FIG. 9 shows a block diagram of the head-mounted display of FIG. 1.

As mentioned above, the methods described above may be performed via any suitable computing device configured to receive user inputs via an eye tracking system, including but not limited to head-mounted display 100. FIG. 9 shows a block diagram of an example configuration of head-mounted display 100.

Head-mounted display 100 may comprise one or more lenses 902 that form a part of a near-eye see-through display subsystem 904. For example, a passcode entry display image 300 may be displayed via a near-eye display comprising lenses 902. Head-mounted display 100 may further comprise one or more outward facing image sensors 906 configured to acquire images of a background scene being viewed by a user, and may include one or more microphones 908 configured to detect sounds, such as voice commands from a user. Outward facing image sensors 906 may include one or more depth sensors and/or one or more two-dimensional image sensors.

Head-mounted display 100 further comprises a gaze detection subsystem 910 configured to detect a direction of gaze of each eye of a user, as described above. The gaze detection subsystem 910 may be configured to determine gaze directions of each of a user's eyes in any suitable manner. For example, in the depicted embodiment, the gaze detection subsystem 910 comprises one or more glint sources 912, such as infrared light sources, configured to cause a glint of light to reflect from the cornea of each eye of a user, and one or more image sensors 914 configured to capture an image of one or more eyes of the user. Images of the glints and of the pupils as determined from image data gathered via image sensor(s) 914 may be used to determine an optical axis of each eye, to which a determined offset may be applied, as described above. It will be understood that the gaze detection subsystem 910 may have any suitable number and arrangement of light sources and image sensors.

Head-mounted display 100 may further comprise additional sensors. For example, head-mounted display 100 may comprise a global positioning (GPS) subsystem 916 to allow a location of head-mounted display 100 to be determined. Information regarding the user's location may then be used, for example, to help determine the identity of an object on an external display at which the user is gazing.

Head-mounted display 100 further may include one or more motion sensors 918 to detect movements of a user's head when the user is wearing head-mounted display 100. Motion data may be used, potentially along with eye tracking glint data and outward-facing image data, for gaze detection, as well as for image stabilization to help correct for blur in images from the outward-facing image sensor(s) 906. The use of motion data may allow changes in gaze location to be tracked even if image data from the outward-facing image sensor(s) 906 cannot be resolved. Likewise, the motion sensors 918, as well as the microphone(s) 908 and the gaze detection subsystem 910, also may be employed as user input devices, such that a user may interact with see-through display system 901 via gestures of the eye, neck and/or head, as well as via verbal commands. It will be understood that sensors illustrated in FIG. 9 is shown for the purpose of example and are not intended to be limiting in any manner, as any other suitable sensors and/or combination of sensors may be utilized.

Head-mounted display 100 further comprises a computing device 920 having a logic subsystem 922 and a storage subsystem 924 in communication with the sensors, the gaze detection subsystem 910, and the see-through display subsystem 904. The storage subsystem 924 comprises instructions stored thereon that are executable by logic subsystem 922, for example, to receive image data from the image sensors, to determine gaze scanpaths from the image data, to compare the gaze scanpaths to stored scanpaths and/or user biometric information (e.g. a visual axis offsets for each of one or more users, corneal curvature information, etc.), to calibrate gaze detection subsystem 910 by determining an offset to apply to subsequent gaze location determinations received in that use session, and applying such offset to the subsequent gaze location determinations. Further information regarding example hardware for the logic subsystem 922, storage subsystem 924, and other above-mentioned components is described below with reference to FIG. 10.

It will be appreciated that the depicted head-mounted display 100 is provided by way of example, and thus is not meant to be limiting. Therefore it is to be understood that the head-mounted device may include additional and/or alternative sensors, cameras, microphones, input devices, output devices, etc. than those shown without departing from the scope of this disclosure. The physical configuration of a head-mounted display device and its various sensors and subcomponents may take a variety of different forms without departing from the scope of this disclosure.

Further, it will be understood that a computing system configured to receive user inputs via an eye tracking system may take any suitable form other than a head-mounted display device, including but not limited to a mainframe computer, server computer, desktop computer, laptop computer, tablet computer, home-entertainment computer, network computing device, gaming device, mobile computing device, mobile communication device (e.g., smart phone), other wearable computer, etc. Additionally, the methods and processes described above may be implemented as a computer-application program or service, an application-programming interface (API), a library, and/or other computer-program product.

Figure 10:
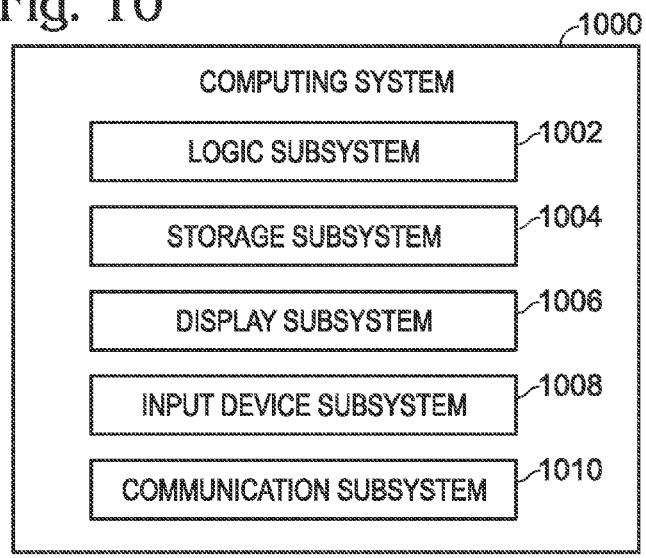
FIG. 10 shows a block diagram of an embodiment of a computing system.

FIG. 10 schematically shows a non-limiting embodiment of a computing system 1000 that can perform one or more of the methods and processes described above. Computing system 1000 is shown in simplified form, and as mentioned above may represent any suitable device and/or combination of devices, including but not limited to those described above with reference to FIGS. 1-9.

Computing system 1000 includes a logic subsystem 1002 and a storage subsystem 1004. Computing system 1000 may optionally include a display subsystem 1006, input device subsystem 1008, communication subsystem 1010, and/or other components not shown in FIG. 10. Computing system 1000 may also optionally include or interface with one or more user input devices such as the above-described eye tracking system, as well as a keyboard, mouse, game controller, camera (depth and/or two-dimensional), microphone, and/or touch screen, for example. Such user-input devices may form part of input device subsystem 1008 or may interface with input device subsystem 1008.

Logic subsystem 1002 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

Logic subsystem 1002 may include one or more processors configured to execute software instructions. Additionally or alternatively, logic subsystem 1002 may include one or more hardware or firmware logic machines configured to execute hardware or firmware instructions. The processors of logic subsystem 1002 may be single-core or multi-core, and the programs executed thereon may be configured for sequential, parallel or distributed processing. Logic subsystem 1002 may optionally include individual components that are distributed among two or more devices, which can be remotely located and/or configured for coordinated processing. Aspects of the logic subsystem may be virtualized and executed by remotely accessible networked computing devices configured in a cloud-computing configuration.

Storage subsystem 1004 includes one or more physical, non-transitory, devices configured to hold data and/or instructions executable by the logic subsystem to implement the herein-described methods and processes. When such methods and processes are implemented, the state of storage subsystem 1004 may be transformed—e.g., to hold different data.

Storage subsystem 1004 may include removable media and/or built-in devices. Storage subsystem 1004 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 1004 may include volatile, nonvolatile, dynamic, static, read/write, read-only, random-access, sequential-access, location-addressable, file-addressable, and/or content-addressable devices. In some embodiments, logic subsystem 1002 and storage subsystem 1004 may be integrated into one or more unitary devices, such as an application-specific integrated circuit (ASIC), or a system-on-a-chip.

It will be appreciated that storage subsystem 1004 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

The term "program" may be used to describe an aspect of computing system 1000 implemented to perform a particular function. In some cases, a program may be instantiated via logic subsystem 1002 executing instructions held by storage subsystem 1004. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1006 may be used to present a visual representation of data held by storage subsystem 1004. This visual representation may take the form of a graphical user interface (GUI). As the herein described methods and processes change the data held by the storage subsystem, and thus transform the state of the storage subsystem, the state of display subsystem 1006 may likewise be transformed to visually represent changes in the underlying data. Display subsystem 1006 may include one or more display devices utilizing virtually any type of technology. Such display devices may be combined with logic subsystem 1002 and/or storage subsystem 1004 in a shared enclosure, or such display devices may be peripheral display devices.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a computing device comprising a gaze estimation system including one or more eye tracking cameras and one or more eye glint light sources, a method of calibrating the gaze estimation system, the method comprising:
    receiving a request to log a user onto the computing device;
    outputting a passcode entry display image to a display device;
    receiving image data from the one or more eye tracking cameras;
    from the image data, determining a gaze scanpath representing a detected path of a user's gaze on the passcode entry display image;
    comparing the gaze scanpath to a stored scanpath for the user; and
    calibrating the gaze estimation system based upon a result of comparing the gaze scanpath to the stored scanpath for the user to compensate for a difference between a visual axis and an optical axis of the user.

2. The method of claim 1, wherein calibrating the gaze estimation system comprises determining a determined offset between the gaze scanpath and the stored scanpath.

3. The computing device of claim 2, further comprising comparing the determined offset with a stored offset, and log on the user only if the determined offset matches the stored offset.

4. The method of claim 1, further comprising adjusting the gaze scanpath to form an adjusted gaze scanpath based upon calibrating the gaze scanpath, and if the adjusted gaze scanpath matches the stored scanpath, then logging on the user.

5. The method of claim 1, further comprising not calibrating the gaze estimation system if the gaze scanpath meets one or more disqualifying criteria.

6. The method of claim 1, wherein calibrating the gaze scanpath to the stored scanpath comprises minimizing an error function that compares the gaze scanpath to the stored scanpath.

7. The method of claim 1, wherein the outputting the passcode entry display image comprises outputting a picture.

8. The method of claim 1, wherein outputting the passcode entry display image comprises outputting the passcode entry display image to a near-eye display.

9. A computing device comprising:
    a logic subsystem; and
    a data-holding subsystem comprising instructions stored thereon that are executable by the logic subsystem to:
        receive a request to log a user onto the computing device;
        output a passcode entry display image to a display device;
        receive image data from a gaze estimation system comprising one or more eye tracking cameras;
        from the image data, determine a gaze scanpath representing a path of a user's gaze on the passcode entry display image;
        compare the gaze scanpath to a stored scanpath for the user;
        calibrate the gaze estimation system based upon a result of comparing the gaze scanpath to the stored scanpath for the user to compensate for a difference between a visual axis and an optical axis of the user;
        adjust the gaze scanpath to form an adjusted gaze scanpath based upon calibrating the gaze scanpath; and
        if the adjusted gaze scanpath matches the stored scanpath, then log on the user.

10. The computing device of claim 9, wherein the computing device comprises the gaze estimation system.

11. The computing device of claim 9, wherein the computing device is a wearable computing device comprising a near-eye display.

12. The computing device of claim 9, wherein the instructions are executable to calibrate the gaze estimation system by determining a determined offset between the gaze scanpath and the stored scanpath.

13. The computing device of claim 12, wherein the instructions are further executable to compare the determined offset to a stored offset, and to log in the user only if the determined offset matches the stored offset and the adjusted scanpath matches the stored scanpath.

14. The computing device of claim 13, wherein the instructions are executable to determine the determined offset by minimizing an error function that compares the gaze scanpath to the stored scanpath for the user.

15. The computing device of claim 9, wherein the instructions are further executable to not calibrate the gaze estimation system if the gaze scanpath meets one or more disqualifying criteria.

16. A computing device, comprising:
    a logic subsystem; and
    a data-holding subsystem comprising instructions stored thereon that are executable by the logic subsystem to:
        receive a request to log a user onto the computing device;
        output a passcode entry picture to a display device;
        receive image data from a gaze estimation system comprising one or more eye tracking cameras;
        from the image data, determine a gaze scanpath representing a path of a user's gaze on the passcode entry display image;
        if the gaze scanpath meets one or more disqualifying criteria, then rejecting the gaze scanpath and not logging on the user;
        if the gaze scanpath does not meet any of the one or more disqualifying criteria, then comparing the gaze scanpath to a stored scanpath for the user;
        calibrating the gaze estimation system based upon a result of comparing the gaze scanpath to the stored scanpath for the user to compensate for a difference between a visual axis and an optical axis of the user;
        adjusting the gaze scanpath to form an adjusted gaze scanpath based upon calibrating the gaze scanpath; and
        if the adjusted gaze scanpath matches the stored scanpath, then logging on the user.

17. The computing device of claim 16, wherein the computing device is a wearable computing device comprising a head-mounted display.

18. The computing device of claim 16, wherein the instructions are executable to calibrate the gaze estimation system by determining a determined offset between the gaze scanpath and the stored scanpath.

19. The computing device of claim 18, wherein the instructions are further executable to compare the determined offset to a stored offset, and to log in the user only if the determined offset matches the stored offset and the adjusted scanpath matches the stored scanpath.

20. The computing device of claim 18, wherein the instructions are executable to determine the determined offset by minimizing an error function that compares the gaze scanpath to the stored scanpath for the user.

* * * * *